United States Patent
Tseng

[11] Patent Number: 6,143,212
[45] Date of Patent: Nov. 7, 2000

[54] SUPER-LOW TEMPERATURE PLASTIC POWDER MANUFACTURING METHOD BY AID OF GAS

[76] Inventor: Shao-Chien Tseng, No. 130 Sec 2. Yang-Shin Rd., Yang-Mei Taoyuan 326, Taiwan

[21] Appl. No.: 09/111,396

[22] Filed: Jul. 7, 1998

[51] Int. Cl.[7] .................................................. B28B 9/10
[52] U.S. Cl. ............................................. 264/12; 264/141
[58] Field of Search ...................................... 264/12, 141

[56] References Cited

U.S. PATENT DOCUMENTS

| | | | |
|---|---|---|---|
| 3,719,733 | 3/1973 | Rakestraw et al. | 264/12 |
| 4,822,267 | 4/1989 | Walz | 264/12 |
| 5,196,049 | 3/1993 | Coombs et al. | 264/12 |

Primary Examiner—Mary Lynn Theisen
Attorney, Agent, or Firm—Pro-Techtor International Services

[57] ABSTRACT

A super-low temperature plastic powder manufacturing method for continuous production of thermo-plastic powder with granule sizes smaller than 10 microns. The method includes the steps of material melting wherein coarse granular thermo-plastic material is melted to form a plastic solution, high air pressure blowing for separation wherein high pressure air is injected to impact the plastic solution to cool and harden it gradually into micro-granules and to thereby reduce its adhesive strength, super-low temperature liquid nitrogen impacting for brittling wherein super low temperature liquid nitrogen is used to reduce the temperature of the plastic micro-granules, and low temperature calendaring. The reduced temperature greatly reduces elongation, impact strength, and fracture resistance of the plastic micro-granules for easier processing.

4 Claims, 7 Drawing Sheets

Elongation of fluorocarbons.

The stress-strain behavior of cellulose acetate at different temperatures.

Impact strength as a function of temperature for PS and HIPS.

Relation between notched Izod impact and temperature for HP ionomer and two super-tough plastics.

Apparent fracture toughness as a function of temperature for a rubber-toughened thermoplastic material.

SUPER-LOW TEMPERATURE PLASTIC POWDER MANUFACTURING METHOD BY AID OF GAS

BACKGROUND OF THE INVENTION

1. Field of the Invention

The present invention is related to a super-low temperature plastic powder manufacturing method using gas, and more particularly is a method of rapidly producing thermo-plastic powder with powder granules under 10 microns by melting the plastic granules in a melting furnace and blowing, in order to cause separation, a plastic solution by high pressure gas at a plastic solution outlet of the melting furnace. Finer spherical plastic micro-granules are gradually formed and are treated with super-low temperature liquid nitrogen to give the plastic micro-granules a low elongation rate, low impact resistance, low fracture resistance and characteristics of extreme brittleness and fragility in order to be rolling pressed by a low temperature calendar to obtain the plastic powder.

2. Description of the Prior Art

Thermo-plastic powder has a fracture resistance and a vibration damping capability superior to those of thermo-setting plastic. When it is used as a matrix to make fiber reinforced thermo-plastics (FRTP), the products are less fragile, simpler to manufacture, cost less, have longer lives, and are less easily damaged as compared to a compound material of general fiber reinforced thermosets (FRTS). By recycling the thermo-plastics, their use is more acceptable. Therefore, the newly developed aeronautic compound materials, golf clubs, bicycle frames and articles for leisure or sporting such as tennis rackets have largely used FRTP products. The continuous-fiber reinforced thermoplastics will eventually be favored for these products.

In manufacturing a workpiece with the continuous-fiber reinforced thermoplastics (FRTP), the material used normally is not mixed from fiber and plastic. In fact, fiber and plastic are mixed in a given mixing ratio, and are made into a prepreg in the form of a sheet or a braided cylinder. Such FRTP prepreg has uniform composition, and is convenient to store and use.

The methods for producing the continuous-fiber reinforced thermoplastics (FRTP) presently include primarily powder prepregging, hot melting, solution dip prepregging and film calendaring. The powder prepregging method can result in better material performance because melted thermoplastic powder has a very large adhesive strength, and high elongation at break, as shown in the following table 1:

TABLE 1

| material | nature of thermoplastics under room temperature (25° C.) | | | | |
|---|---|---|---|---|---|
| | tensile strength (ksi) | tensile elongation at break (%) | tensile elastic modulus (msi) | impact strength (ft-lbf/in) | density (g/cm$^2$) |
| Nylon 6 | 6–14 | 30 | 0.38 | 0.6–2.2 | 1.12 |
| Nylon 66 | 11–12 | 60 | 0.4 | 0.55–1.0 | 1.13 |
| Polycarbonate (PC) | 9.5 | 110 | 0.34 | 2.3 | 1.20 |
| PET | 8.5 | 50 | 0.4 | 0.7–1.0 | 1.34 |
| Polypropylene (PP) | 4.5–6.0 | 200 | 0.1 | 0.4–1.2 | 0.89 |
| PPS | 12 | 5.0 | 0.48 | 0.63 | 1.30 |
| PPO | 7.80 | 50 | 0.38 | 5.0 | 1.10 |
| PEEK | 14.5 | >40 | 0.45 | 1.6 | 1.28–1.32 |
| UHMWPE | 7.0 | 350 | 0.10 | 30 | 0.93 |
| PSU (Udel P-1700) | 10.2 | 75 | 0.36 | 1.2 | 1.24 |

Data from: Engineered Materials Handbook, Vol. 2, ASM International, 1988.

Given that elongation at break of Nylon 6 is 30%, Nylon 66 is 60%, PET is 50%; and some material are over 100%, (for example, PC is 110%, and PP is over 200%), infiltration of thermoplastics and wetting of fiber in the thermo-plastics is not effective. Therefore, the hot melting, the solution dip prepregging or the film calendaring method cannot effectively overcome the above stated defect. If the powder prepregging is used, the powder which is very fine can be uniformly distributed into the scattered bundle of fiber (tow), and is consolidated in the heating and pressurizing processes in manufacturing the workpiece. This yields an FRTP product with a good dipping effect, so that fibers therein can provide the advantage of high strength and high elastic modulus, and the quality of the product can be assured.

Although the powder prepregging method produces a better product with better uniformity, such superiority can only be provided when the size of the granules of the plastic powder is small enough (under 10 microns), so that the granules easily penetrate into the tow. Therefore, it is a key technique in the continuous-fiber reinforced thermo-plastic (FRTP) manufacturing process to use thermo-plastic powder with granules having sizes smaller than 10 microns.

The current techniques for producing thermo-plastic powder must use crushing and grinding to grind the coarse granular thermo-plastic into the fine powder, such as by using a hammer mill or a ball mill. When the ball mill is used to execute the final grinding work, it is more capable of producing thermo-plastic powder with granule sizes smaller than 10 microns. However, grinding time is long, up to 24–48 hours. This is not economical, because when in mass production, consumption of the grinding balls is very large.

Further, under the action of the stress of shearing forces during grinding, thermo-plastic often creates a re-melting phenomenon causing the fine powder to agglomerate again, thus enlarging the size of the granules. The beneficial effect of grinding is thereby often largely reduced when grinding the coarse granular thermo-plastic with a ball mill.

SUMMARY OF THE INVENTION

In view of the problems stated above, the inventor of the present invention provides a fast and effective method of producing thermoplastic powder. The invention takes advantage of the low elongation, low impact resistance, low fracture resistance and the features of extreme brittleness and fragility of the thermoplastic powder at super low temperatures. The invention thereby achieves an object of continuous production of thermo-plastic powder with granule sizes smaller than 10 microns.

The present invention will be apparent after reading the detailed description of the preferred embodiment thereof in reference to the accompanying drawings.

DETAILED DESCRIPTION OF THE PREFERRED EMBODIMENT

Figure 1:
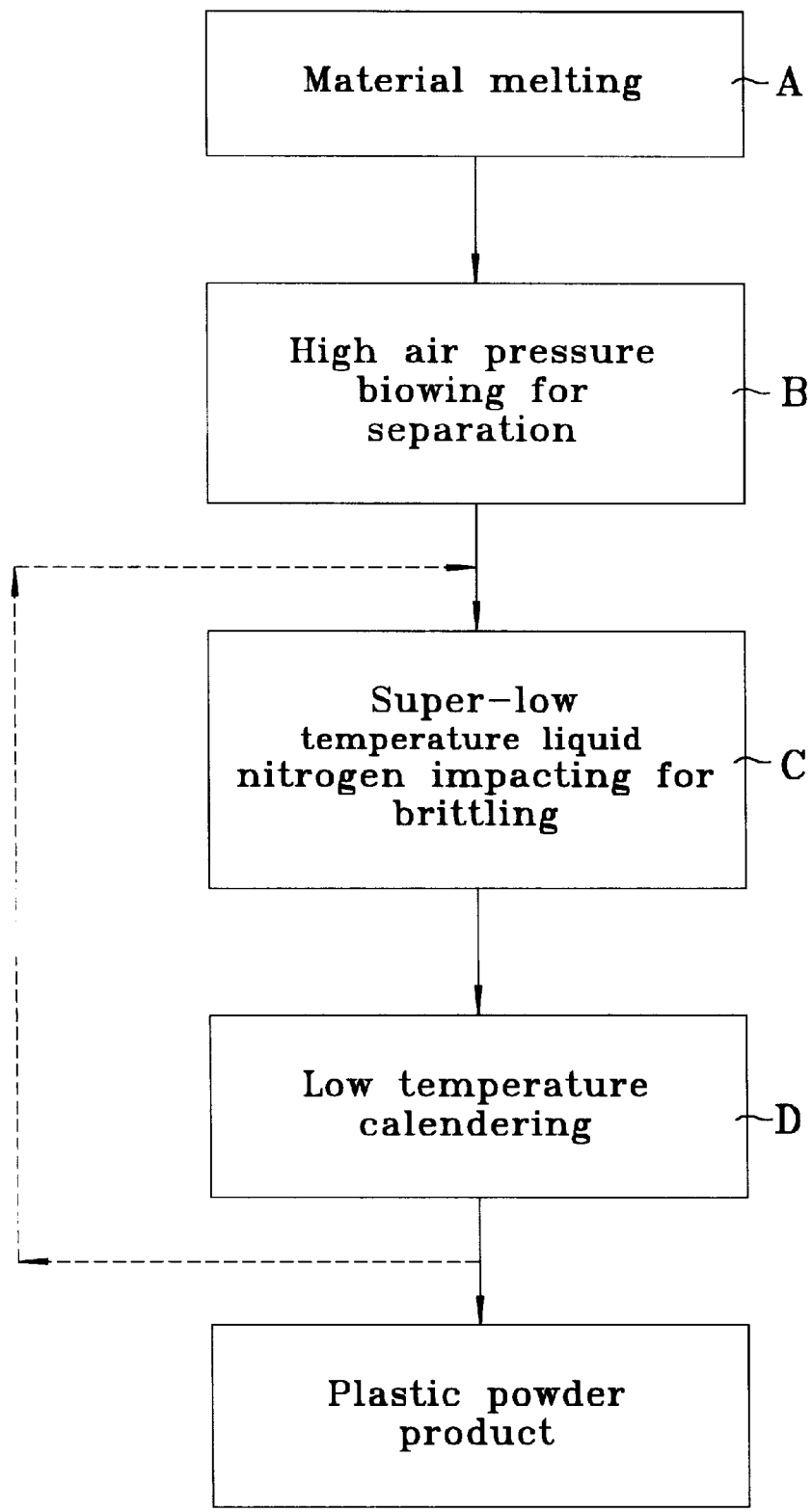
FIG. 1 is a production flow chart of the present invention.
Figure 2:
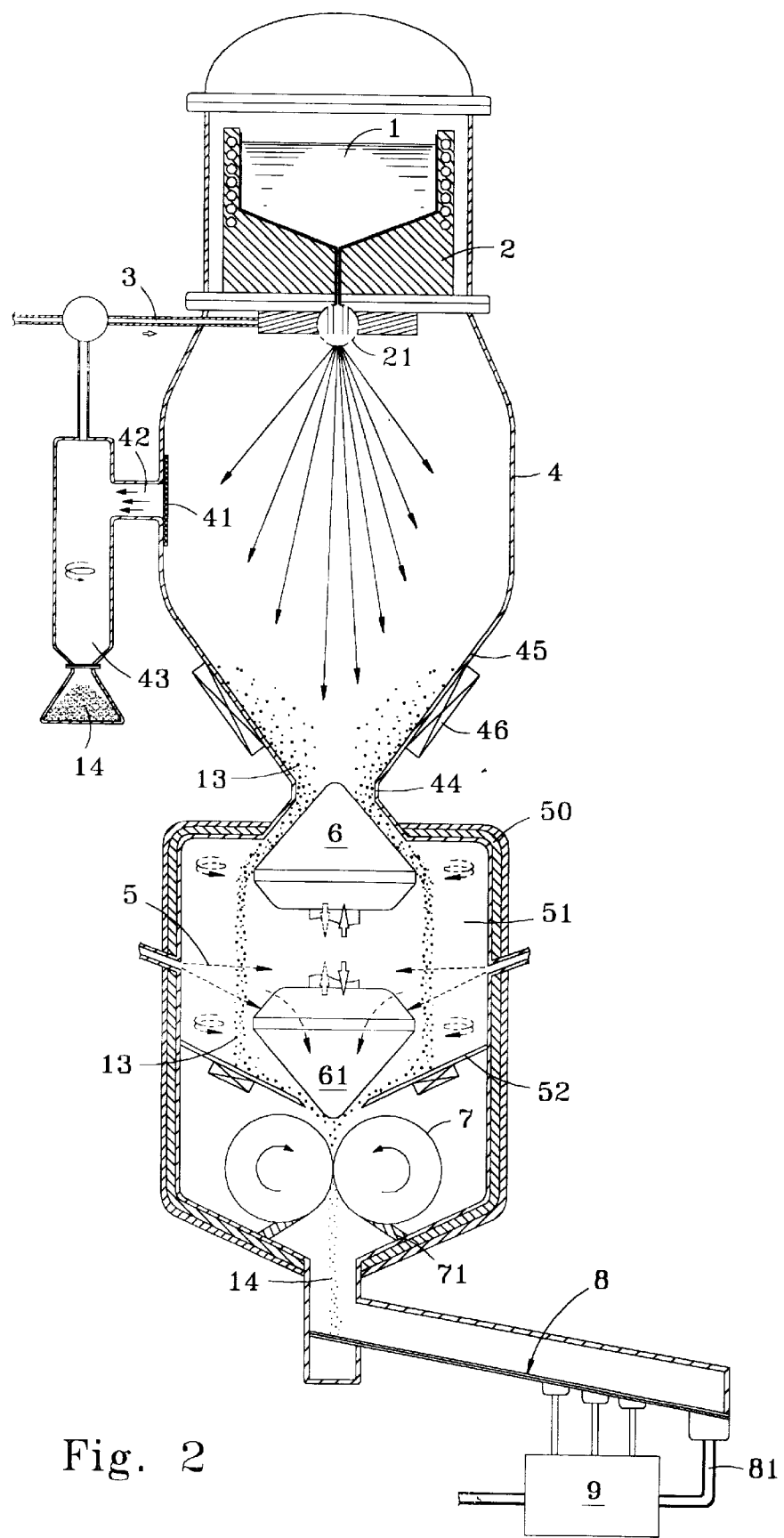
FIG. 2 is a sectional view of the equipment for the production method of the present invention.

Referring first to FIG. 1, the super-low temperature plastic powder manufacturing method using gas provided by the present invention can obtain the desired thermo-plastic powder with granule sizes smaller than 10 microns through a unique manufacturing process. The process includes the steps of: (A) material melting, (B) high air pressure blowing for separation, (C) super-low temperature liquid nitrogen impacting for brittling, and (D) low temperature calendaring. The present invention is now described as follows with the equipment shown in FIG. 2:

The equipment shown in FIG. 2 is a preferred embodiment of the manufacturing method of the present invention. The device comprises a top melting furnace 2, a supplying passage 31 for high pressure gas 3 provided at a plastic solution outlet 21 of the melting furnace 2, and a chamber 4 provided beneath the melting furnace 2 for collecting granules. A valve 6 is provided in a neck 44 at the bottom of the melting furnace 2. An air supplying chamber 51 is provided beneath the chamber 4 for supplying super low temperature liquid nitrogen 5. The wall 50 of the air supplying chamber 51 provides insulation. A conical plate 52, a valve 61, and a pair of rolling wheels 7 are provided in the air supplying chamber 51. A sieve set 8 and a packing set 9 are provided under the rolling wheels 7. Following are the steps of the manufacturing method:

(A) Material melting: coarse granular thermo-plastic material is placed into the melting furnace 2 which is then heated to a temperature at least 50° C. higher than the melting point of the thermo-plastic in order to adequately melt the coarse granular thermo-plastic material to form a plastic solution 1 with better fluidity, and to later increase the effect of separation by blowing.

Figure 3:
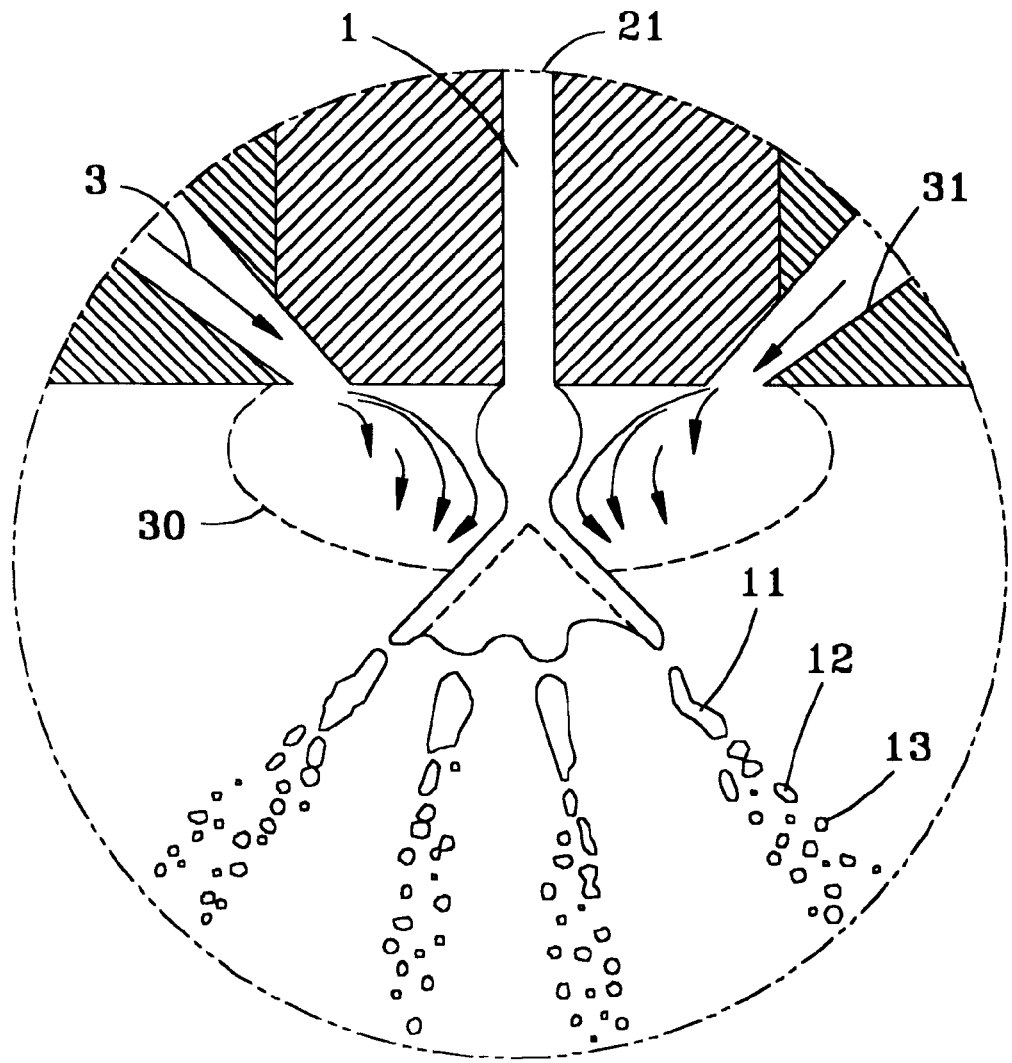
FIG. 3 is an enlarged schematic view of the present invention in the blowing separation of a plastic solution with air pressure.

(B) High air pressure blowing for separation: The high pressure air 3 is injected at the plastic solution outlet 21 of the melting furnace 2. When the high pressure air 3 at the plastic solution outlet 21 contacts the plastic solution 1, an inflation area 30 is formed, and the flowing plastic solution 1 is cooled and hardened, so that the adhesive strength of the plastic is reduced gradually. In other words, the plastic solution is blown to gradually form elongated groups 11, elliptical groups 12, and even to be gradually separated into the form of fine, ball-like plastic micro-granules 13 (referring to FIG. 3).

Diameters of the fine, ball-like plastic micro-granules 13 are not uniform. Some have sizes smaller than 10 microns as desired, but most of them do not. As the plastic micro-granules 13 are dropped into the chamber 4 of the equipment during processing, the micro-granules 13 smaller than 10 microns form plastic powder 14 which is absorbed by a powder collecting manifold 42 with a filtering net 41 that is provided on a wall of the chamber 4. The powder 14 is moved to another powder collecting chamber 43, while other micro-granules 13 are stopped by the filtering net 41, and waft down to a conical fluid guiding wall 45 near the neck 44. The micro-granules 13 then are vibrated by a vibrator 46 provided on the conical wall 45 so that they move to the air supplying chamber 51 through the valve 6.

Figure 4:
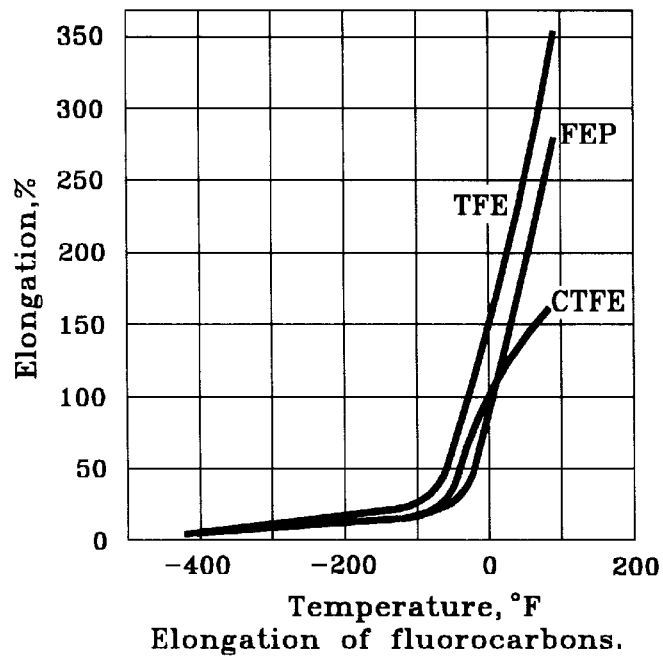
FIG. 4 shows performance curves of the present invention showing the relationship between temperature and elongation of fluorocarbons which are taken as examples.
Figure 5:
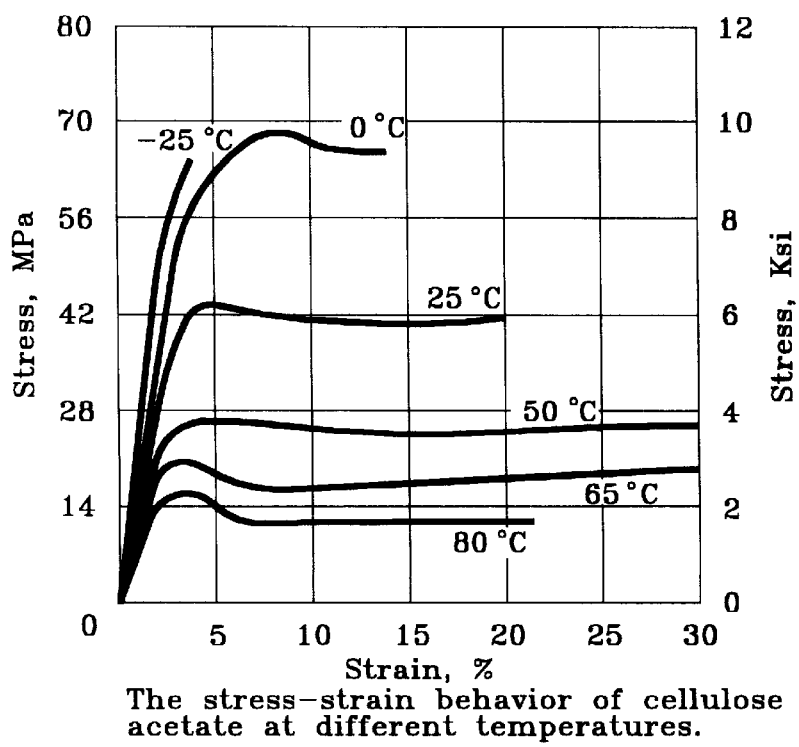
FIG. 5 shows performance curves of the present invention showing the relationship between strain and stress of cellulose acetate which is taken as an example.
Figure 6:
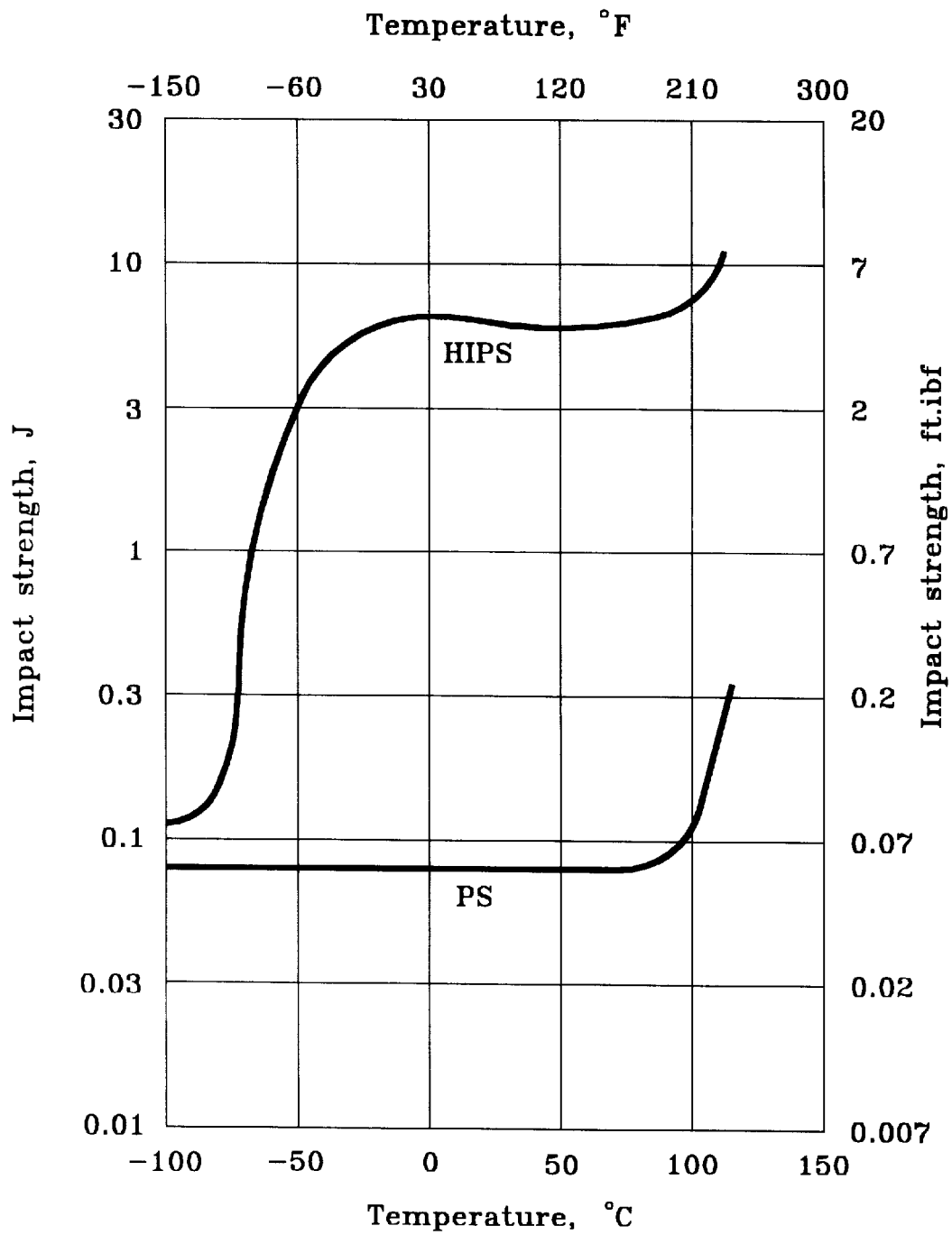
FIG. 6 shows performance curves of the present invention showing the relationship between temperature and impact strength of HIPS and PS which are taken as examples.
Figure 7:
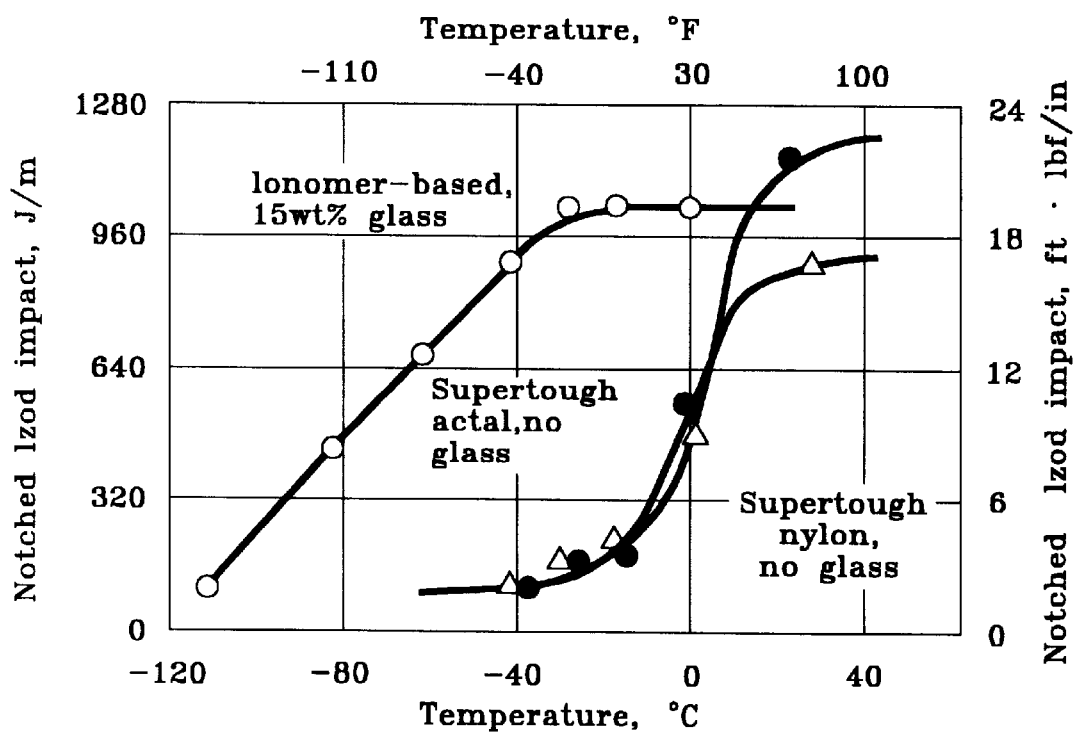
FIG. 7 shows performance curves of the present invention showing the relationship between temperature and impact strength on multiple super strong thermoplastics which are taken as examples.
Figure 8:
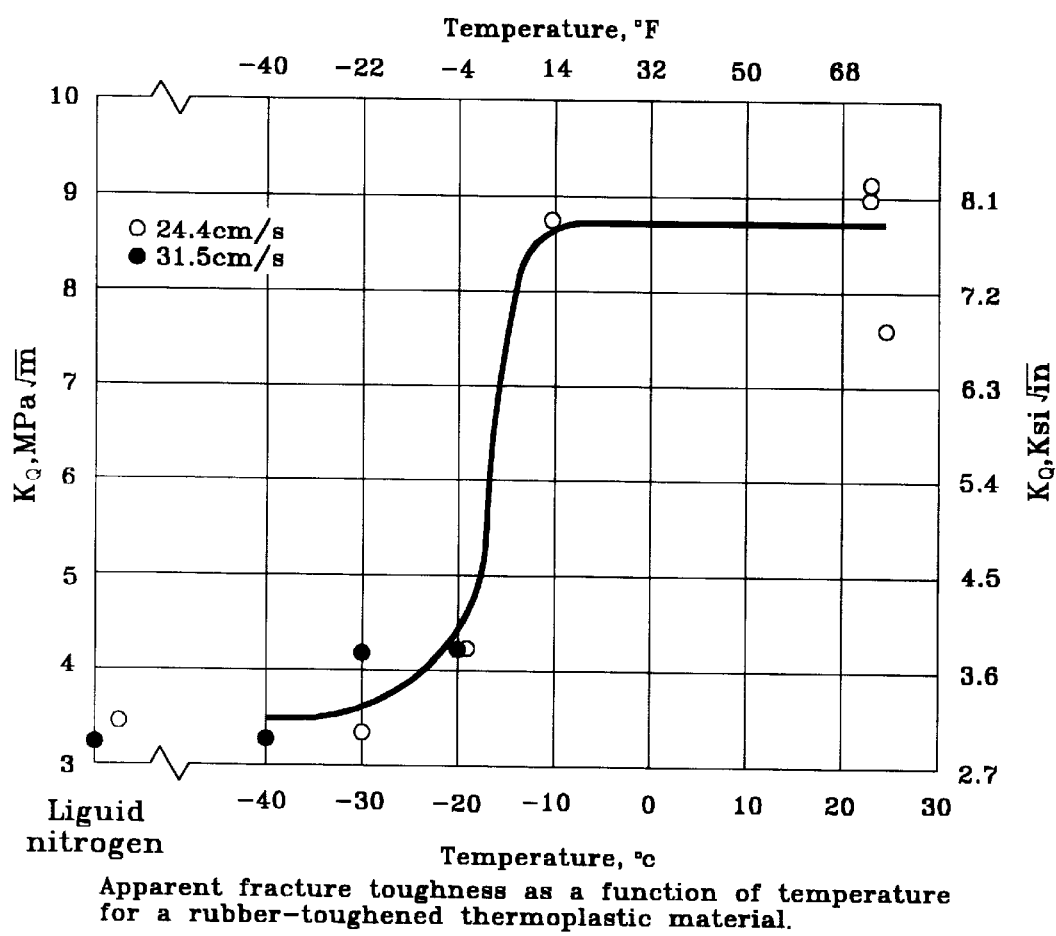
FIG. 8 shows a curve of the present invention showing a thermoplastic material being largely reduced in fracture resistance under temperature lowering action of liquid nitrogen.

(C) Super-low temperature liquid nitrogen impacting for brittling: The upper and the lower valves 6 and 61 in the air supplying chamber 51 must be synchronously operated to close the material inflow and outflow ports. Super low temperature liquid nitrogen 5 is injected into the air supplying chamber 51 to impact the plastic micro-granules 13. The temperature of the granules 13 is lowered to about −60° C. to −160° C., so that elongation of the plastic micro-granules 13 is reduced. Taking the fluorocarbons shown in FIG. 4 as an example when the temperature is lowered to about −60° C. to −160° C., the desired level of elongation is achieved. Taking the cellulose acetate shown in FIG. 5 as another example, change of performance in relation to stress and strain can be seen. The lower the temperature, the smaller the elongation, and the cellulose acetate becomes brittle. When the super low temperature liquid nitrogen 5 is used to greatly lower the temperature of the micro-granules 13, the impact strength of the micro-granules 13 is greatly lowered such as is shown in the examples depicted in FIGS. 6 and 7. The lower the temperature, the lower the impact strength of the thermo-plastic material will be. Further, lowering the temperature of the micro-granules 13 by the super low temperature liquid nitrogen 5 can also greatly reduce the fracture resistance thereof. For example, the apparent fracture resistance of the thermo-plastics under stress at different temperatures in FIG. 8 shows that the more the temperature is lower than zero, the lower the fracture resistance values of the thermoplastics are.

(D) Low temperature calendaring: The fine, ball-like plastic micro-granules 13 drop onto the conical plate 52 which vibrates. By opening the valve 61, the particles 13 are shaken and moved into the area between the pair of rolling wheels 7 under the action of the super low temperature liquid nitrogen 5. There, the plastic micro-granules 13 with extreme fragility are rolled by the low temperature rolling wheels 7 to form finer plastic powder 14, which has granule sizes mostly smaller than 10 microns. This process meets the requirement for a prepreg for manufacturing a continuous-fiber reinforced thermo-plastics (FRTP).

The rolling wheels 7 are both provided on the bottom thereof with a scraping plate 71 for scraping the plastic powder 14 formed after pressing by rolling. The sieve set 8 is provided under the rolling wheels 7 to separate the plastic powder 14 smaller than 10 microns from the plastic powder 14 larger than 10 microns. The latter is recycled by a recirculating pipe 81 to repeat the process of brittling and rolling pressing in order to make the granules smaller. Most of the plastic powder 14 smaller than 10 microns screened from the sieve set 8 is packed by the packing set 9, thereby providing the plastic powder 14 required for obtaining the object of manufacturing continuous-fiber reinforced thermo-plastics (FRTP) prepregs.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. A super-low temperature plastic powder manufacturing method using gas, comprising the following steps:
   (a) material melting, wherein coarse granular thermo-plastic material is melted to form a plastic solution;
   (b) high air pressure blowing for separation, wherein high pressure air is injected to impact said plastic solution to cool and harden it gradually and to thereby reduce its adhesive strength, said plastic solution is subjected to said high pressure air blowing to gradually form fine, rounded plastic micro-granules;
   (c) super-low temperature liquid nitrogen impacting for brittling, wherein super low temperature liquid nitrogen is used to impact said plastic micro-granules, thereby greatly reducing elongation, impact strength, and fracture resistance of said plastic micro-granules, therefore, said plastic micro-granules are rendered brittle and extremely fragile; and
   (d) low temperature calendaring, wherein said fine, rounded plastic micro-granules are subjected to pressing rolling by a pair of low temperature rolling wheels, said low temperature calendaring is also under the action of said super low temperature liquid nitrogen.

2. The super-low temperature plastic powder manufacturing method using gas as defined in claim 1, wherein, during said material melting step, a temperature of said coarse granular thermo-plastic material is increased to at least 50° C. above the melting point of said plastic micro-granules in order to melt said coarse granular thermo-plastic material to form a fluid plastic solution, and to thereafter increase a separation effect of said high air pressure blowing of said plastic solution.

3. The super-low temperature plastic powder manufacturing method using gas as defined in claim 1, wherein, by a blowing and separation action of said high pressure air blowing, said plastic solution forms elongated groups, elliptical groups, and gradually separates to form said fine, rounded plastic micro-granules.

4. The super-low temperature plastic powder manufacturing method using gas as defined in claim 1, wherein, during said super-low temperature liquid nitrogen impacting for brittling, a temperature of said fine, rounded plastic micro-granules is lowered to −60° C. to −160° C.

* * * * *